United States Patent [19]

Muzzarelli

[11] Patent Number: 4,835,265
[45] Date of Patent: May 30, 1989

[54] SUBSTITUTED AND CROSSLINKED GLUCANS, PROCESS AND INTERMEDIATES FOR PREPARING THEM AND USE THEREOF

[75] Inventor: Riccardo Muzzarelli, Ancona, Italy

[73] Assignee: Consiglio Nazionale Delle Ricerche, Rome, Italy

[21] Appl. No.: 875,482

[22] Filed: Jun. 18, 1986

[30] Foreign Application Priority Data

Jun. 21, 1985 [IT] Italy ................................ 21261 A/85

[51] Int. Cl.$^4$ .......................... C07H 5/04; C07H 5/06; C07B 37/08
[52] U.S. Cl. ..................................... 536/18.7; 536/20; 536/18.5; 536/55.2; 536/55.3; 514/54; 514/62
[58] Field of Search .................... 514/54, 62; 536/179, 536/20, 18.5, 18.6, 18.7, 55.2, 55.3, 124, 121

[56] References Cited

U.S. PATENT DOCUMENTS

| | | | |
|---|---|---|---|
| 4,373,09 | 2/1983 | Koshugi ................................. | 536/20 |
| 3,879,376 | 4/1975 | Vanlerberghe et al. ............... | 536/20 |
| 4,125,708 | 11/1978 | Masri et al. ............................ | 536/20 |
| 4,424,346 | 1/1984 | Hall et al. .............................. | 536/20 |
| 4,683,298 | 7/2887 | Yalpani ................................. | 536/18.7 |

FOREIGN PATENT DOCUMENTS 28126 6/1981 United Kingdom .
458839 12/1936 United Kingdom .

OTHER PUBLICATIONS

Biotechnology & Bioengineering, Daniel I. C. Wang, vol. 27, Aug. 1985, pp. 1115-1121.
N-(Carboxymethylidene)Chitosans and N-(Carboxymethyl)-Chitosans: Novel Chelating Polyampholytes Obtained From Chitosan Glyoxylate Riccardo A. A. Muzzarelli et al., (1982), pp. 199-214.
N-(o-Carboxybenzyl) Chitosans: Novel Chelating Polyampholytes, Riccardo A. A. Muzzarelli et al., (1982), pp. 145-157.

Primary Examiner—Ronald W. Griffin
Assistant Examiner—Nancy S. Carson
Attorney, Agent, or Firm—Cushman, Darby & Cushman

[57] ABSTRACT

Glucans substituted by reacting oxo acids with the amino groups of a chitosan or of a polyglucosamine, reducing the imines thus formed and crosslinking the thus obtained compounds to yield gels having high adsorbing power and interaction selectivity with metal ions even in acid or highly saline medium.

4 Claims, No Drawings

SUBSTITUTED AND CROSSLINKED GLUCANS, PROCESS AND INTERMEDIATES FOR PREPARING THEM AND USE THEREOF

This invention relates to substituted and crosslinked glucans, their use as adsorbing agents, the process for preparing them, and to some intermediates particularly useful in their preparation.

Chitosans are glucans currently prepared by treatment of chitin [(1-4)-2-acetamido-2-deoxy-beta-D-glucan)]. Said treatment consists of a partial (approximately 60%) deacetylation of the acetamido groups on carbon 2 of the anhydroglucoside rings. Therefore chitosans are aminopolysaccharides wherein approximately 60% of amino groups are in free form.

Chitosans are used in cosmetics and in the preparation of medical and surgical products. They are also used as flocculants for municipal and industrial waste waters, etc. (Muzzarelli R., "Chitin" Pergamon Press, Oxford 1977).

One of these uses is as an adsorbing medium for removal and separation of metal ions and proteins.

Said use of chitosans is not however very widespread because their adsorption performances are rather low owing to the poor chelating power of the acetamido groups.

It has now been found that these drawbacks can be overcome by using new compounds obtained from an oxo acid by reductive amination with a glucan and by subsequent crosslinking of the thus obtained compound.

More particularly the new compounds of this invention can be prepared by reacting a glucan with an oxo acid of formula $$R_1-CO-R_2-COOH \qquad (I)$$

where $R_1$ is hydrogen, phenyl, or 1-6C alkyl optionally substituted by hydroxy, 1-3 C alkoxy, mercapto, 1-3C alkylmercapto, carboxy, phenyl and hydroxphenyl; and $R_2$ is a covalent bond, phenylene or 1-3 C alkylene optionally substituted by hydroxy and phenyl;
reducing the imine thus obtained to yield a glucan substituted with amino acid units and treating it with a crosslinking agent of formula $$X-(CH_2)_n-CHY-CH_2Z \qquad (II)$$

where

X is halogen;
Y is halogen, or together with Z, oxygen;
Z is OH, SH, or together with Y, oxygen; and
n is 1, 2, 3, 4, 5, or 6.

Optionally the glucan is treated with a compound of formula II, then with a compound of formula I and finally reduced.

The glucans substituted and crosslinked in accordance with this invention are characterized by the fact that from 10 to 100% of the carbon atoms on 2 position of the anhydroglucoside rings of glucan carry a substituent of formula $$\begin{array}{c} -NH \\ | \\ R_1-CH-R_2-COOH \end{array} \qquad (III)$$

where $R_1$ and $R_2$ have the above indicated means; and in that 10-100% of the primary hydroxy groups on 6 position are crosslinked by means of a compound of formula (II).

Preferred meanings of $R_1$ are H, phenyl, methyl, ethyl, butyl, isobutyl, pentyl, hexyl, hydroxymethyl, hydroxyethyl, tetrahydroxybutyl, methylmercaptoethyl, carboxymethyl, carboxyethyl, benzyl and p-phydroxybenzyl.

Preferred meanings of $R_2$ are a covalent bond, phenylene, methylene, ethylene, propylene, trihydroxypropylene and propylphenyl.

The glucans used as starting material in accordance with this invention can be prepared by deacetylation of chitin.

Deacetylation is preferably carried out until there is obtained polyglucosamine [(1-4)-2-amino-2-deoxy-beta-D-glucan], a polysaccharide in which nearly all the carbon atoms on 2 position of each anhydroglucoside ring of glucan carry a primary amino group.

Thus for example by boiling a chitosan in a 40% aqueous solution of sodium hydroxide under nitrogen for 6 hours a polyglucosamine having a deacetylation degree higher than 85% is obtained. Repeating the treatment with sodium hydroxide the deacetylation degree reaches about 98%. The course of the deacetylation may be monitored by conventional techniques such as infrared spectrometry, potentiometric titration, or first derivative spectrophotometry (R. Muzzarelli et al., Carbohydrate polymers, Elzevire Applied Sc. Publ. Amsterdam, 1985, Vol. V, 461-472).

The reaction of the glucan with the compound of formula I is carried out in a moderately acid medium according to known techniques for preparing Schiff bases.

Examples of suitable compounds of formula I are: pyruvic acid, phenyl pyruvic acid, p-hydroxyphenylpyruvic acid, beta-hydroxypyruvic acid, 2-keto-glutaric acid, glyoxylic acid, alpha-keto-gamma-methylthiobutyric acid, alpha-ketoisocaproic acid, oxalacetic acid, levulinic acid, acetoacetic acid, 5-keto-D-gluconic acid, 2-keto-D-gluconic acid, malonaldehydic acid, glutaraldehydic acid, phthalaldehydic acid, isophthalaldehydic acid, therephthalaldehydic acid, p-(3-formylpropyl)benzoic acid, 3-oxovaleric acid, 2-keto-3-hydroxybutyric acid, 3-benzoylpropionic acid and 4-benzoylbenzoic acid.

Some oxo acids of formula I may be easily obtained from sugars by chemical treatment or fermentation. Examples of said oxo acids are 2-keto-D-gluconic and 5-keto-D-gluconic acid.

The subsequent reduction to yield the corresponding glucans substituted with amino acid units is carried out according to known techniques with suitable reducing agents such as sodium cyanoborohydride, sodium borohydride, or hydrogen gas.

Examples of glucans substituted with amino acid units according to this invention are: glycine glucan, alanine glucan, phenylalanine glucan, tyrosine glucan, serine glucan, glutamate glucan, methionine glucan, leucine glucan, aspartate glucan, threonine glucan and aminogluconate glucan. All these compounds when isolated from an acid medium clearly show on infrared spectrophotometry the typical band at 1730 cm$^{-1}$ of the carboxy group.

Possessing both the carboxy and the secondary amino group these compounds are polyampholytes.

These intermediate compounds, i.e. the glucans substituted with amino acid units are new; they are therefore another object of this invention.

To carry out the crosslinking of the glucans substituted with amino acid units it is necessary that the hydroxy groups of the glucan be in the form of a metal alcoholate, preferably of an alkali metal.

This can be obtained by treating the glucan with a suitable alkali metal derivative, e.g. sodium hydroxide, at room temperature. When necessary this step is carried out in the presence of a suitable organic solvent mixable with water, such as an aliphatic alcohol.

Crosslinking is performed in the presence of a suitable organic solvent, such as dioxane.

Whatever the reaction sequence is the final compounds are fine colourless, transparent, rigid gels containing approximately 90% water and can be freeze-dried to yield white powders.

The gels thus obtained lend themselves very well to chromatographic applications because they form excellent columns with low pressure drop and high flow. They are chemically stable amphoteric substances which can be used in filtering units for removal of metal ions from water and solutions, to recover precious metals, to fix catalysts, and in general as adsorbent in affinity chromatography as well as for applications in immunology and biochemistry. As shown in the following examples the glucans substituted with amino acid units and crosslinked can be used with advantage under very severe conditions. They adsorb metal ions even from acid solutions (pH 2.9) and highly concentrated brines (15% salt).

The best results are obtained with gels prepared from polyglucosamine, the performance of which is quite surprising and unexpected if compared with that of other known polysaccharides.

The ampholytic character of these gels allows the use thereof to be extended to immobilization of substances which do not interact specifically with known polysaccharides.

The following examples are intended to illustrate the invention without however limiting it.

EXAMPLE 1

Glucan substituted with amino acid units

To a suspension in water (1.5 l) of polyglucosamine (10 g) having pK 6.2 and acetylation degree of 13% was added beta-hydroxypyruvic acid (8.20 g; 0.09 mol). The resulting pH value (approximately 3) was adjusted to 4 with 0.2M NaOH. The insoluble product was then reduced with sodium cyanoborohydride dissolved in water (5.85 g in 50 ml) and the pH was finally adjusted to about 7 with 1M NaOH. After 48 hours the glucan substituted with serine was washed, dialyzed against water and isolated in the form of white powder.

Working as described above but using instead of beta-hydroxypyruvic acid, pyruvic, phenyl pyruvic, p-hydroxyphenyl pyruvic acid, 2-ketoglutaric, glyoxylic, alpha-keto-gamma-methylthiobutyric, alpha-ketoisocaproic acid, oxalacetic acid, 2-keto-D-gluconic acid, 5-keto-D-gluconic acid and 2-keto-3-hydroxybutyric acid were obtained alanine glucan, phenylanine glucan, tyrosine glucan, glutamate glucan, glycine glucan, methionine glucan, leucine glucan, aspartate glucan, aminogluconate glucan and threonine glucan, respectively.

By carrying out more than one treatment with substechiometric quantities of several oxo acids, glucans substituted with more than one type of amino acid unit were obtained.

EXAMPLE 2

Crosslinked glycine glucan

Glycine glucan (1 g) prepared from glyoxylic acid as described in Example 1 was suspended in 40% NaOH (5 ml) and isopropyl alcohol (25 ml) and stirred continuously. After approximately 60 hours a mixture of dioxane (90 ml), water (52.5 ml) and epichlorohydrin (2.5 ml) was added. The reaction required approximately 72 hours for completetion.

Small particles of colourless transparent and rigid gel were formed which were submitted to dialysis against water and isolated. The product thus obtained contained 90–92% water.

EXAMPLE 3

Adsorption of metal ions on crosslinked serine glucan

Crosslinked serine glucan obtained from polyglucosamine, beta-hydroxypyruvic acid and epichlorohydrin as described in the above Examples 1 and 2 was contacted with cobalt, nickel and copper solutions at pH values between 5 and 6 in the batch mode. The initial concentration ranges were 50–1000 mg/l for Co, Cu and Ni. After 24 hours the capacities were measured and plotted against the equilibrium concentrations. The results showed that the capacity of the crosslinked serine glucan for cobalt is 1% and 20% by weight for equilibrium concentrations of 6 mg/l and 850 mg/l, respectively. For nickel it is 0.8% and 11.5% by weight for equilibrium concentrations of 2 mg/l and 870 mg/l, respectively. For copper it is 6% and 28% by weight for equilibrium concentrations of less than 1 mg/l and 750 mg/l, respectively.

The polymers showed the characteristic colours pink, green and blue for cobalt, nickel and copper, respectively.

The above data show that the crosslinked serine glucan has a high capacity for the transition metal ions in high concentrations and that the capacity is maintained at relatively high values for low metal concentrations in batch operations.

In the presence of 50 ml of 0.5 mM cobalt, varying amounts of the amino acid glucans (10–25 mg) showed the following collection percentages: alanine glucan, 16–20%; phenylalanine glucan, 10–20%; tyrosine glucan, 16–20%; glutamate glucan, 10–20%; and methionine glucan, 12–30%.

EXAMPLE 4

Adsorption of metal ions on crosslinked glycine glucan

Crosslinked glycine glucan prepared as described in Example 2 was contacted with cobalt, nickel, copper and cadmium solutions at pH values between 2.9 and 3.5, adjusted with sulfuric acid, and in the batch mode. The initial concentrations of each metal ion were 0.2 mM and 0.5 mM. The collection percentages after 16 hours of contact were: for cobalt 84.5 and 85.5, for nickel 98.6 and 97.6, for copper 98.8 and 99.3, and for cadmium 99.86 and 98.88.

The polymers exhibited the typical colours pink, green, blue and yellow for cobalt, nickel, copper and cadmium, respectively.

The above data show that the crosslinked glycine glucan is very effective in collecting transition metal ions even from acid solutions.

EXAMPLE 5

Recovery of traces of cobalt and copper from water by means of crosslinked glycine glucan Two chromatographic columns of crosslinked glycine glucan gel (5.5×0.6 cm) were fed with solutions of cobalt and copper sulfate, respecitvely, at a concentration of 10 mg/l and a flowrate of 1 ml/min. The breakthrough points were after passage of 1.6 l of solution. Concentration measurement were stopped when metal concentration at the outlet was 2 mg/l. The columns became shorter (4.5 cm) and red and blue for cobalt and copper respectively. Since the dry weight of the crosslinked glycine glucan used in each column was 130 mg the capacity was approximately 12% by weight.

The above data show that crosslinked glycine glucan can be used effectively in column for removal of traces of transition metal ions from solutions with exceptionally high capacity for low metal concentrations.

EXAMPLE 6

Removal of traces of metals from brines

A satured solution of sodium fluoride (20 ml) containing traces of cobalt and copper (10 and 70 micrograms respectively) and a 13% solution of sodium chloride (200 ml) containing traces of cobalt and copper (11 and 24 micrograms, respectively) were percolated through columns identical with those of Example 5 at a flowrate of 1 ml/min.

After washing with demineralized water (5 ml) the metals were eluted with 0.5N sulfuric acid and determined by hot graphite atomic adsorption spectometry. Yields were 100, 87, 95 and 98% respectively at concentrations from 50 to 350 micrograms per liter. In a similar way a 13% solution of sodium chloride containing 100 micrograms of chromium (in sulfate form) per liter gives a recovery yield of 100%. The chromatographic bands in the column with adsorbed chromium, cobalt and copper were violet, pink and blue, respectively.

The above data show that traces of the transitions metal ions can be removed from brines having high salt concentrations, with practically quantitative yields.

EXAMPLE 7

Adsorption of metals; comparing chitosan, chitosan glucan and crosslinked glycine glucan Three 6 mm diameter chromatographic columns were filled with 750 mg of chitosan from crabs, 750 mg of chitosan glucan from *Aspergillus niger*, and 200 mg of glycine glucan crosslinked with epichlorohydrin in gel form, respectively. Through said columns was percolated, at a flowrate of 1 ml/min, a solution containing 10 mg/l of copper (in sulfate form). Analytical data were measured on the effluents and the saturation curves were plotted. It was found that detectable quantities of copper were present in the effluents after passage of 170 ml, 940 ml and 1000 ml, respectively, for the three polymers corresponding to chelated quantities of copper of 1.7, 9.4 and 10 mg, respectively with corresponding capacities of 2.26 mg/g for chitosan, 12.5 mg/g for chitosan-glucan, and 50 mg/g for crosslinked glycine glucan. Crosslinked glycine glucan has a capacity 22 times higher than crab chitosan and 4 times higher than *Aspergillus niger* chitosan glucan.

I claim:

1. A substituted and crosslinked glucan in which from 10 to 100% of the 2 position carbon atoms of the anhydroglucoside unit carry a substituent of formula:

where $R_1$ is (a) hydrogen; (b) phenyl or 1-6 C alkyl; or (c) substituted phenyl or substituted 1-6 C alkyl, substituted by hydroxy, 1-3 C alkoxy, mercapto, 1-3 C alkylmercapto, carboxy, phenyl or hydroxyphenyl; and $R_2$ is a covalent bond, phenylene, 1-3 C alkylene or 1-3 C alkylene substituted by hydroxy or phenyl; and from 10 to 100% of the primary hydroxy groups on 6 position are crosslinked by means of a compound of formula $$X-(CH_2)_n-CHY-CH_2Z \qquad (II)$$

where

X is halogen;

Y is halogen, or together with Z, oxygen;

Z is OH, SH, or together with Y, oxygen; and n is 1, 2, 3, 4, 5 or 6.

2. A method for removal or recovery of metal ions by chelation from a solution, wherein a solution containing metal ions is contacted with a substituted and crosslinked glucan according to claim 1 above.

3. A process for preparing a substituted and crosslinked glucan, in which a glucan, wherein from 10 to 100% of the 2 position carbon atoms of the anhydroglucoside unit carry a primary amino group, is reacted with a compound of formula $$R_1-CO-R_2-COOH \qquad (I)$$

where $R_1$ is (a) hydrogen; (b) phenyl or 1-6 C alkyl; or (c) substituted phenyl or substituted 1-6 C alkyl, substituted by hydroxy, 1-3 C alkoxy, mercapto, 1-3 C alkylmercapto, carboxy, phenyl or hydroxyphenyl; and $R_2$ is a covalent bond, phenylene, 1-3 C alkylene or 1-3C alkylene substituted by hydroxy or phenyl;

the imine thus obtained is reduced, and finally from 10 to 100% of the primary hydroxy group on 6 position are crosslinked by treatment with a compound of formula $$X-(CH_2)_n-CHY-CH_2Z \qquad (II)$$

where

X is halogen;

Y is halogen, or together with Z, oxygen;

Z is OH, SH, or together with Y, oxygen; and n is 1, 2, 3, 4, 5 or 6.

4. A substituted glucan in which from 10 to 100% of the 2 position carbon atoms of the anhydroglucoside unit carry a substituent of formula

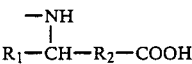
(III)
where
R₁ is (a) hydrogen; (b) phenyl or 1-6 C alkyl; or (c) substituted phenyl or substituted 1-6 C alkyl, substituted by hydroxy, 1-3 C alkoxy, mercapto, 1-3 C alkylmercapto, carboxy, phenyl or hydroxyphenyl; and
R₂ is a covalent bond, phenylene, 1-3 C alkylene or 1-3 C alkylene substituted by hydroxy or phenyl, provided, however, that R₂ is not a covalent bond when R₁ is hydrogen.
* * * * *